US008103903B2

(12) United States Patent
Hafner et al.

(10) Patent No.: US 8,103,903 B2
(45) Date of Patent: *Jan. 24, 2012

(54) READ-MODIFY-WRITE PROTOCOL FOR MAINTAINING PARITY COHERENCY IN A WRITE-BACK DISTRIBUTED REDUNDANCY DATA STORAGE SYSTEM

(75) Inventors: James L. Hafner, San Jose, CA (US); Prashant Pandey, San Jose, CA (US); Tarun Thakur, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,123

(22) Filed: Feb. 22, 2010

(65) Prior Publication Data

US 2011/0208995 A1   Aug. 25, 2011

(51) Int. Cl.
*G06F 11/00* (2006.01)
(52) U.S. Cl. .................. 714/6.24; 711/155; 711/114
(58) Field of Classification Search .................. None
See application file for complete search history.

(56) References Cited

U.S. PATENT DOCUMENTS

| | | | |
|---|---|---|---|
| 4,916,605 A | 4/1990 | Beardsley et al. | |
| 5,388,108 A * | 2/1995 | DeMoss et al. | 714/6.12 |
| 5,627,990 A | 5/1997 | Cord et al. | |
| 5,720,025 A * | 2/1998 | Wilkes et al. | 714/6.12 |
| 6,223,323 B1 | 4/2001 | Wescott | |
| 6,298,415 B1 | 10/2001 | Riedle | |
| 6,353,895 B1 | 3/2002 | Stephenson | |
| 6,427,212 B1 | 7/2002 | Frey, Jr. | |
| 6,446,220 B1 * | 9/2002 | Menon | 714/5.11 |
| 6,446,237 B1 | 9/2002 | Menon | |

(Continued)

FOREIGN PATENT DOCUMENTS

EP    0 594 464 A2    4/1994

(Continued)

OTHER PUBLICATIONS

Crews, C.V., et al., "Parity Preservation for Redundant Array of Independent Direct Access Storage Device Data Los Minimization and Repair," IBM Technical Disclosure Bulletin, Mar. 1, 1993, pp. 473-478, v. 36, No. 3, United States.

(Continued)

*Primary Examiner* — Christopher McCarthy
(74) *Attorney, Agent, or Firm* — Kenneth L. Sherman, Esq.; Michael Zarrabian, Esq.; Myers Andras Sherman & Zarrabian LLP

(57) ABSTRACT

Data storage reliability is maintained in a write-back distributed data storage system including multiple nodes, each node comprising a processor and an array of failure independent data storage devices. Information is stored as a set of stripes, each stripe including a collection of multiple data strips and associated parity strips, the stripes distributed across multiple corresponding primary data nodes and multiple corresponding parity nodes. A primary data node maintains the data strip holding a first copy of data, and each parity node maintains a parity strip holding a parity for the multiple data strips. A read-modify-write parity update protocol is performed for maintaining parity coherency, the primary data node driving parity coherency with its corresponding parity nodes, independently of other data nodes, in order to keep its relevant parity strips coherent.

17 Claims, 7 Drawing Sheets

U.S. PATENT DOCUMENTS

| | | | |
|---|---|---|---|
| 6,542,960 B1 | 4/2003 | Wong et al. | |
| 6,553,511 B1 | 4/2003 | DeKoning et al. | |
| 6,718,444 B1* | 4/2004 | Hughes | 711/155 |
| 6,725,392 B1 | 4/2004 | Frey et al. | |
| 6,732,290 B1 | 5/2004 | Perry et al. | |
| 6,898,668 B2 | 5/2005 | Thompson et al. | |
| 6,950,901 B2* | 9/2005 | Chiu et al. | 711/114 |
| 6,970,987 B1 | 11/2005 | Ji et al. | |
| 6,983,396 B2 | 1/2006 | Brant et al. | |
| 6,993,676 B2 | 1/2006 | Corbin et al. | |
| 7,093,157 B2 | 8/2006 | Hajji | |
| 7,149,847 B2 | 12/2006 | Frey, Jr. et al. | |
| 7,159,150 B2 | 1/2007 | Kenchammana-Hosekote et al. | |
| 7,206,991 B2* | 4/2007 | Chatterjee et al. | 714/770 |
| 7,516,354 B2* | 4/2009 | Nguyen et al. | 714/6.24 |
| 7,529,970 B2 | 5/2009 | Hartline et al. | |
| 7,653,829 B2 | 1/2010 | Kim et al. | |
| 2002/0091897 A1 | 7/2002 | Chiu et al. | |
| 2003/0225899 A1 | 12/2003 | Murphy | |
| 2004/0093464 A1 | 5/2004 | Hassner et al. | |
| 2005/0050267 A1 | 3/2005 | Yamamoto et al. | |
| 2005/0102548 A1* | 5/2005 | Lindenstruth et al. | 714/1 |
| 2006/0112302 A1 | 5/2006 | Cherian | |
| 2006/0161805 A1 | 7/2006 | Tseng et al. | |
| 2007/0028145 A1 | 2/2007 | Gerhard et al. | |
| 2007/0067667 A1 | 3/2007 | Ikeuchi et al. | |
| 2008/0040553 A1 | 2/2008 | Ash et al. | |
| 2008/0109616 A1 | 5/2008 | Taylor | |
| 2009/0157958 A1* | 6/2009 | Maroney et al. | 711/114 |
| 2010/0180153 A1 | 7/2010 | Jernigan, IV et al. | |

FOREIGN PATENT DOCUMENTS

| | | |
|---|---|---|
| JP | 7-152499 | 6/1995 |
| JP | 2006252414 A | 9/2006 |

OTHER PUBLICATIONS

Hafner, "WEAVER Codes: Highly Fault Tolerant Erasure Codes for Storage Systems," FAST '05: 4th USENIX Conference on File and Storage Technologies, Dec. 2005, pp. 211-224, published at http://www.usenix.org/events/fast05/tech/full_papers/hafner_weaver/hafner_weaver.pdf, United States.

SOLSIE.COM, "IBM Acquired XIV Nextra: Targeting Web 2.0 Storage Need," Jan. 11, 2008, downloaded at http://solsie.com/2008/01/ibm-acquired-xiv-nextra-targeting-web-20-storage-need/, 7 pages, United States.

International Search Report and Written Opinion mailed Mar. 22, 2011 for International Application No. PCT/EP2011/052572 from European Patent Office, pp. 1-12, Rijswijk, The Netherlands.

Mourad, A.N. et al., "Recovery Issues in Databases Using Redundant Disk Arrays," Journal of Parallel and Distributed Computing, vol. 17, No. 1, Elsevier, Jan. 1, 1993, pp. 75-89, Amsterdam, The Netherlands.

U.S. Non-Final Office Action for U.S. Appl. No. 12/710,101 (IBM2-P.34) mailed Apr. 7, 2011.

U.S. Non-Final Office Action for U.S. Appl. No. 12/710,162 (IBM2.PAU.37) mailed Apr. 15, 2011.

U.S. Notice of Allowance for U.S. Appl. No. 12/710,162 mailed Sep. 19, 2011.

U.S. Final Office Action for U.S. Appl. No. 12/710,101 mailed Sep. 28, 2011.

* cited by examiner

READ-MODIFY-WRITE PROTOCOL FOR MAINTAINING PARITY COHERENCY IN A WRITE-BACK DISTRIBUTED REDUNDANCY DATA STORAGE SYSTEM

BACKGROUND

1. Field of the Invention

The invention relates generally to maintaining data reliability, and more particularly, the present invention relates to parity coherency in data storage.

2. Background

In information technology (IT) systems, often data is stored with redundancy to protect against component failures resulting in loss of data. Such data redundancy can be provided by simple data mirroring techniques or via erasure coding techniques. Erasure codes are the means by which storage systems are made reliable. In erasure coding, data redundancy is enabled by computing functions of user data such as parity (exclusive OR) or other more complex functions such as Reed-Solomon encoding. A Redundant Array of Inexpensive Disks (RAID) stripe configuration effectively groups capacity from all but one of the disk drives in a disk array and writes the parity (XOR) of that capacity on the remaining disk drive (or across multiple drives). When there is a failure, the data located on the failed drive is reconstructed using data from the remaining drives.

When data is updated by a host device, the redundancy data (parity) must also be updated atomically to maintain consistency of data and parity for data reconstruction or recovery as needed. In most cases, such updates can be time consuming, as they usually involve many storage device accesses. To mitigate this effect, a redundancy system may employ a write-back or "fast write" capability wherein one or more copies of new host write data (i.e., host data and one or more copies thereof) are stored/written in independent cache components of the system. The write is acknowledged as complete to the host and the parity updates are delayed to a more suitable time (e.g., at de-stage time of new write data).

In monolithic systems (e.g., a controller with two redundant processors where all the storage disks are accessible to both processors), atomic parity update can be more easily managed by one of the processors with a full knowledge of events during the process. Recovery from error or interruption is simplified. However, in a distributed redundancy data storage system including a collection of loosely coupled processing nodes that do not share the same disks, there are many more components, less shared knowledge and many more failure states and events. Consequently, achieving atomic parity update is more difficult. "Distributed" means that it is a collection of nodes. "Redundant" means that it must have erasure coding. In a write-thru system (without fast write), if a parity update fails prior to acknowledgement of the write to the host, then the write fails and recovery is driven by the host. However, with a distributed redundancy storage system employing fast write, the host data is committed by the distributed redundancy storage system and must be reliably available at any future time. Consequently, the atomic parity update must be managed internally within the distributed redundancy storage system.

BRIEF SUMMARY

Data storage reliability is maintained in a write-back distributed data storage system including multiple nodes, each node comprising an array of failure independent data storage devices. In one embodiment, information is stored as a set of stripes, each stripe including a collection of multiple data strips and associated parity strips, the stripes distributed across multiple corresponding primary data nodes (data owner nodes) and multiple corresponding parity owner nodes. For each stripe, a primary data node maintains the associated data strip holding a first copy of data, and a parity owner node maintains a parity strip holding a parity for the collection of data strips, wherein parity coherency is maintained. A read-modify-write parity update protocol is performed for maintaining parity coherency, wherein a primary data node drives parity coherency with its corresponding parity nodes, independently of other data nodes, in order to keep its relevant parity strips coherent.

Another embodiment provides a write-back distributed data storage system, comprising multiple nodes, each node comprising an array of failure independent data storage devices. The nodes are configured for storing information as a set of stripes, each stripe including a collection of multiple data strips and associated parity strips, the stripes distributed across multiple corresponding primary data nodes and multiple corresponding parity nodes. A primary data node is configured for maintaining the data strip holding a first copy of data, and each parity node maintaining a parity strip holding a parity for the multiple data strips. The primary data node is further configured for performing a read-modify-write parity update protocol for maintaining parity coherency, the primary data node driving parity coherency with its corresponding parity nodes, independently of other data nodes, in order to keep its relevant parity strips coherent.

Another embodiment provides a computer program product for maintaining data storage reliability in a write-back distributed data storage system including multiple nodes, each node comprising an array of failure independent data storage devices. The computer program product comprises a computer readable medium having a computer usable program code embodied therewith. The computer usable program code comprises computer usable program code configured to store information as a set of stripes, each stripe including a collection of multiple data strips and associated parity strips, the stripes distributed across multiple corresponding primary data nodes and multiple corresponding parity nodes. The computer usable program code further comprises computer usable program code configured for the primary data node to maintain the data strip holding a first copy of data, and each parity node to maintain a parity strip holding a parity for the multiple data strips, and perform a read-modify-write parity update protocol for maintaining parity coherency. The primary data node drives parity coherency with its corresponding parity nodes, independently of other data nodes, in order to keep its relevant parity strips coherent.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments providing data redundancy in information technology (IT) systems. While the following description will be described in terms of such systems for clarity and placing the invention in context, it should be kept in mind that the teachings herein may have broad application to all types of systems, devices and applications.

Most distributed storage systems either perform only write-thru or coordinate parity computations at the host or client. Coordinating parity computations enables recovery and coordination in a manner similar to a write-thru system. The write-thru and coordinating parity computations have similar latency costs, as more work is performed before the write is fully complete to the application. As such, improvement in reducing the complexity of parity update directly improves the distributed storage system performance and reliability.

A read-modify-write (RMW) protocol for maintaining parity coherency in a write-back distributed redundancy data storage system is provided. In one embodiment, the RMW protocol employs a data-driven RMW parity update protocol with fast write to improve processing for parity updates spread across nodes of the system and yet meets client guarantees for superior reliability and system design simplicity.

Figure 1:
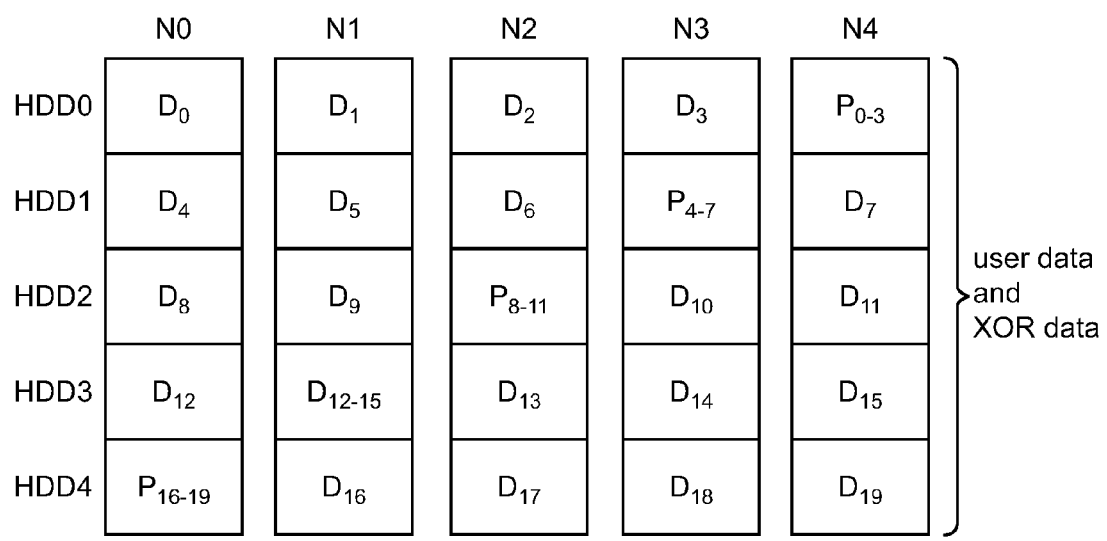
FIG. 1 shows an example distributed redundancy storage system.

The following terminology is provided to help in understanding the description further below.

node a computer and disk enclosure with a distributed redundancy module, processor, memory, disks, power supply, etc., in a data storage system.
primary disk a disk within a node that holds a first copy of host data.
primary data node a node that holds the primary disk along with other disks.
user data data written by a host or client to a storage system for possible later retrieval.
parity data redundancy calculated by a scheme to recover lost user data.
strip a chunk (block) of user data or parity.
stripe a collection of data strips and parity strips that are connected by parity calculations (an example is shown in FIG. 1 described further below).
parity node a node that holds one of the parity strips for a collection of data strips in a stripe.
RMW read-modify-write.
driver a primary data node with new data in its cache which drives or begins the parity update protocol.

In one embodiment, the invention maintains data storage reliability in a write-back distributed data storage system including multiple nodes, each node comprising a processor and an array of failure independent data storage devices. Maintaining data storage reliability comprises storing information as a set of stripes, each stripe including a collection of multiple data strips and associated parity strips, distributed across multiple corresponding primary data nodes and multiple corresponding parity nodes. A primary data node maintains the data strip holding a first copy of data, and each parity node maintaining a parity strip holding a parity for the multiple data. A RMW parity update protocol is performed for maintaining parity coherency, a primary data node driving parity coherency with its corresponding parity nodes, independently of other data nodes, in order to keep its relevant parity strips coherent. Preferably, each parity is calculated based on a different parity calculation formula.

In an example stripe, n+1 nodes are required to store the data of n independent nodes. FIG. 1 shows a distributed redundancy storage system stripe configuration with an array of nodes (i.e., N0, . . . , N4), each node having multiple disk drives (i.e., HDD0, . . . , HDD4), effectively groups capacity from all but one of the nodes and writes the parity P (e.g., XOR) of that capacity on remaining nodes or across multiple nodes (as shown). For example, the data strips $D_0, \ldots, D_3$ in HDD0 of nodes N0, . . . , N3, respectively, are for user data, and a parity strip $P_{0-3}$ in HDD0 of node N4 is for corresponding parity data (e.g., XOR of $D_0, \ldots, D_3$). The data strips $D_0, \ldots, D_3$ and parity strip $P_{0-3}$ form a stripe. Spreading the parity data across the nodes as shown allows spreading the task of reading the parity data over several nodes as opposed to just one node. Writing on a node in a stripe configuration requires that one or more new parities be calculated for this new data and the new parities be written over the old parities in each of the nodes holding a parity. According to the data-driven RMW parity update protocol, each primary data node generally acts independently of other data nodes, even of the same stripe, in keeping its relevant parity strips coherent and correct. For example in FIG. 1, primary data node N0 owns data strip $S_0$ on primary disk HDD0 and drives nodes N4 for coherency and reliability of its data or parity with respect to the rest of the stripe formed by $D_0, \ldots, D_3, P_{0-3}$. There is no restriction that information on a disk be only data or only parity. Other embodiments may have disks within a node containing primary data for one stripe and parity data for another stripe.

Figure 2:
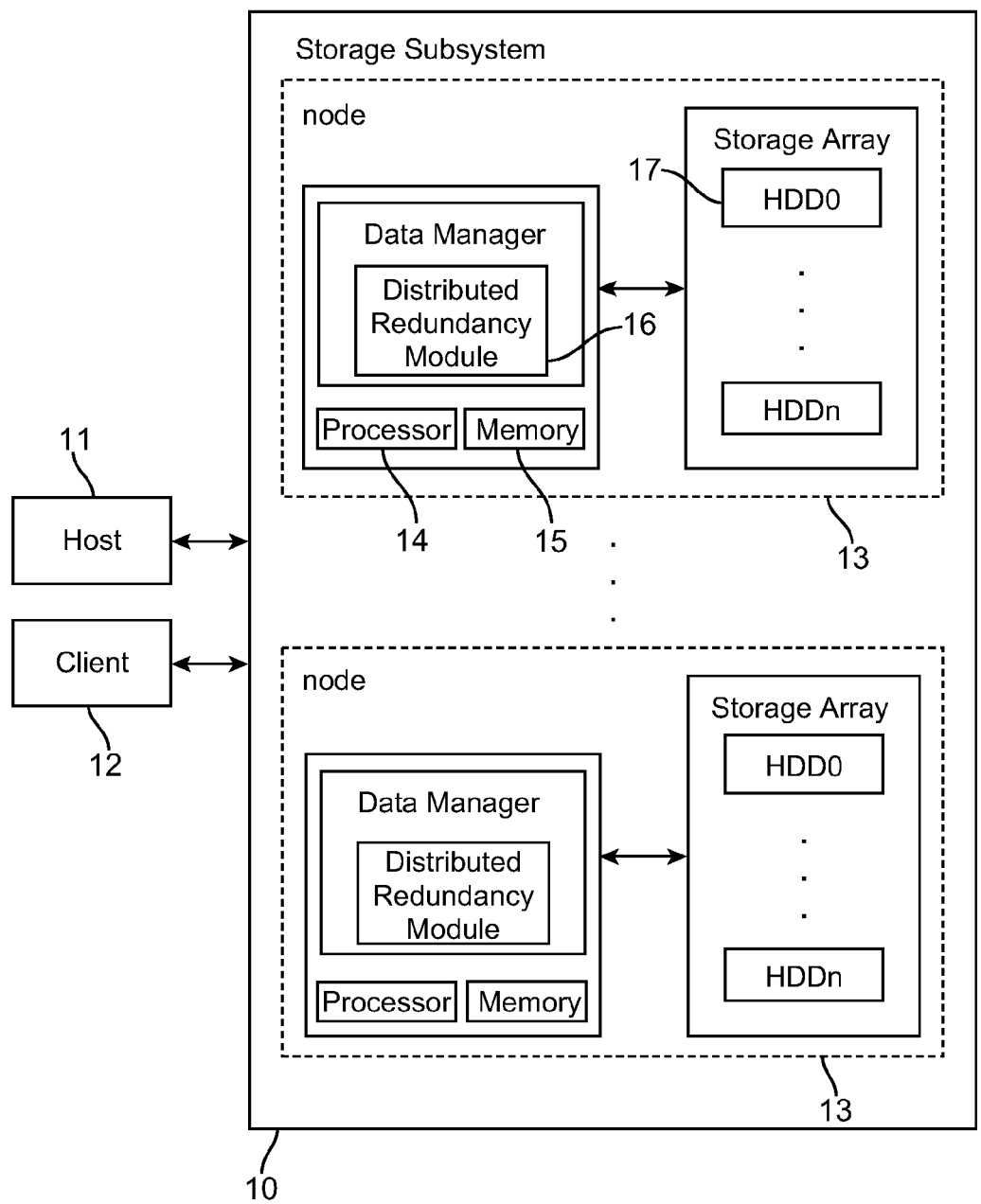
FIG. 2 shows a block diagram of a system for read-modify-write (RMW) protocol for maintaining parity coherency in a write-back distributed redundancy data storage system.

FIG. 2 shows a write-back distributed redundancy data storage system 10 that implements a data-driven RMW parity update protocol, according to an embodiment of the invention. The system 10 is utilized for storing data from a host system 11 and/or a client system 12. The system 10 includes multiple nodes 13. Each node comprises a processor 14, memory 15, a data manager including a distributed redundancy module 16, and an array of storage devices such as hard disk drives 17 (e.g., HDD0, . . . , HDDn). In one implementation, the distributed redundancy module 16 comprises program code for execution by the processor. In another implementation, the distributed redundancy module comprises firmware.

The distributed redundancy module 16 in each node implements the data-driven RMW parity update protocol for maintaining parity coherency in the data storage system 10. Parity update is performed in the system 10 that uses fast write (write-back) behavior at a time subsequent to the completion of any fast write operations. Generally, each node 13 that owns a primary disk for a strip is responsible for driving the coherency and reliability of its data or parity with respect to the rest of the stripe. This is different from a data storage system in which one node is responsible for coherency either on a global level or on a per stripe basis. According to the data-driven RMW parity update protocol described herein, since each primary data node generally acts independently of other data nodes in keeping its relevant parity strips coherent and correct, the overall explicit coordination between nodes of the same stripe is reduced, and coordination is performed by less explicit means, such as protocol serialization (described further below).

For the example implementations described herein, the distributed redundancy storage system 10 (FIG. 2) is fault tolerant to two storage device failures (either disk or node). Those skilled in the art recognize that generalization to higher fault tolerance is within the scope of the invention. Each data strip is encoded into two parity strips. This is extendible to more than two parity strips for higher fault tolerant systems. The data-driven RMW parity update protocol enables a data node 13 to maintain (either in memory or on disk) at least two copies of data for a strip (new fast write data and parity integrated data). The data-driven RMW parity update protocol is data driven since it is initiated by a primary data node to its parity nodes. The parity update protocol follows a forwarded or chained messaging protocol between the participants (i.e., from the primary data node through each of its parity nodes in a specified order, with responses following the reverse order). The parity update protocol is implemented in each of the nodes 13 in FIG. 2. Each node 13 serves a primary data node for certain data, and serves as a parity node for certain other data, each node being capable of performing each of the functions of the protocol (driver, first parity, second parity, etc.).

A data owning node initiates a parity data update protocol on the distributed storage system 10 employs fast write capabilities to compute parity data that is used to recover lost data. The parity data update protocol includes:
 a. a message forwarding protocol.
 b. two phases: a preparation/lock phase and a commit/unlock phase.
 c. a read-modify-write sub-protocol for new parity computations at each parity node.
 d. a specified parity node forwarding order for each of the primary data nodes.

A recovery protocol is driven by a successor driver (survivor closest to the primary data node in the forwarding order). The primary data node is the initial driver. If the driver terminates (or fails), then the next node in the forwarding chain assumes that role. The role of the driver is to complete the protocol by forcing it to go forward via a commit phase or to force it to roll back via an explicit abort phase.

Figure 3:
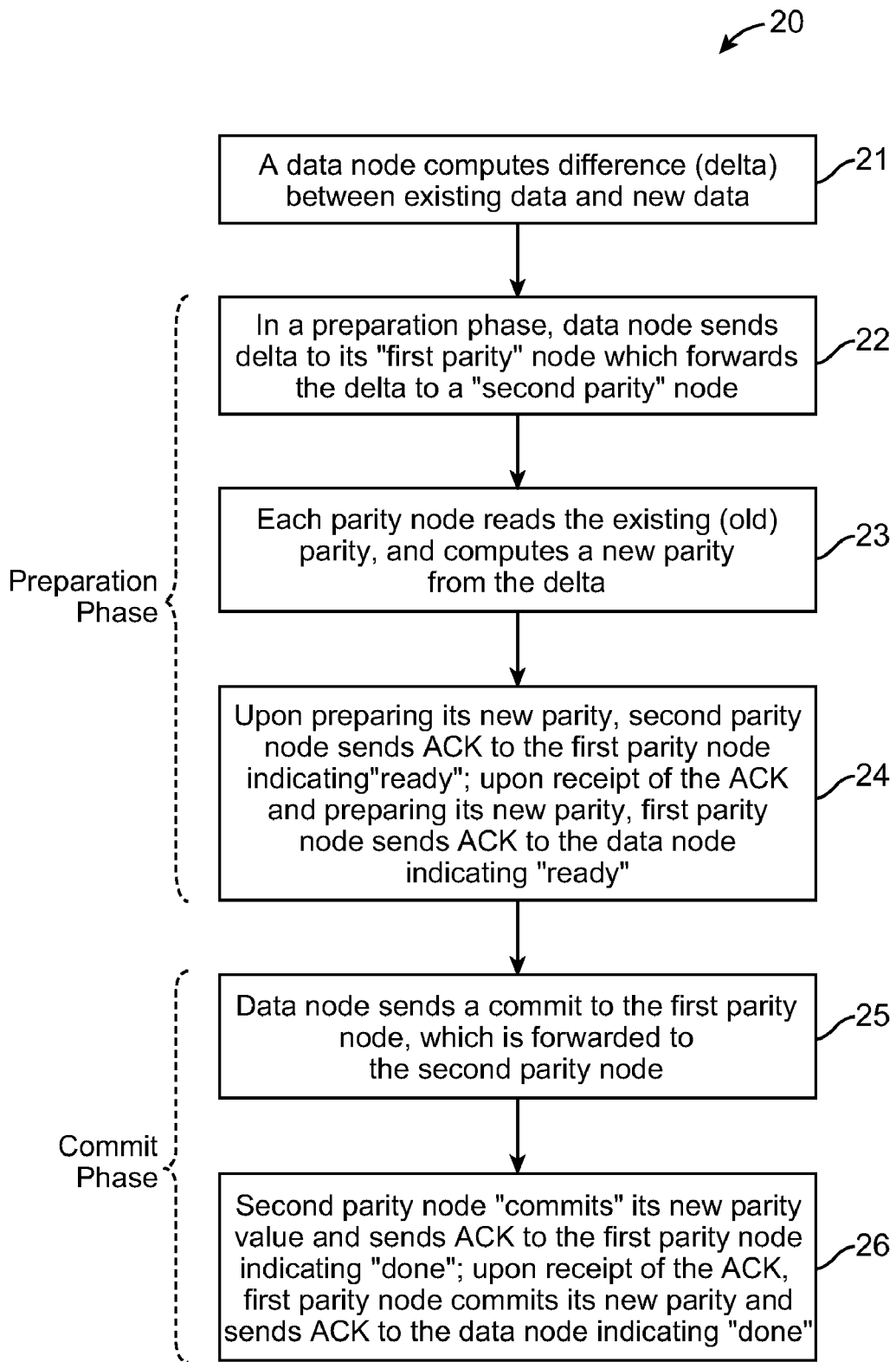
FIG. 3 shows a flowchart of a RMW protocol process for maintaining parity coherency in a write-back distributed redundancy data storage system.

FIG. 3 shows a flowchart of a process 20 implementing an embodiment of the parity data update protocol, including:
 Block 21: A primary data node computes a delta (difference) between existing (old) and new data for a strip (e.g., reading existing from disk and comparing to new data).
 Block 22: In a preparation/lock phase, the primary data node locks its new data from update, and sends the delta to its "first parity" node (according to the ordering), which locks its parity from update by another primary data node and forwards the delta to a "second parity" node. The second parity node locks its parity from update by another primary data node. The lock at each node means no other operation should take place that affects the data (at the primary data node) or parity (at any parity node) during this protocol (until the unlock step).
 Block 23: Each parity node reads the existing (old) parity, and computes a new parity from the delta.
 Block 24: When the second parity node has prepared its new parity, the second parity node sends an acknowledge (ACK) reply message back to the first parity node indicating "ready". When the first parity node receives the ACK from the second parity node and has also prepared its new parity, the first parity node sends an ACK to the primary data node indicating "ready". This ends the prepare phase.
 Block 25: In a commit/unlock phase, the primary data node sends a commit message to the first parity node, which is forwarded to the second parity node.
 Block 26: The second parity node "commits" its new parity value, unlocks its parity from update by another primary data node, and sends an ACK back to the first parity node indicating "done". The first parity node commits its new parity, unlocks its parity from update by another primary data node, and sends an ACK back to the data node indicating "done". The primary data node, on receipt of the first parity node's ACK, unlocks its new data from update, marks its new data as parity integrated and invalidates its old copy. This completes the protocol.

The message communication may be via a communication line, host, bus connecting the nodes, etc., implementing a message forwarding protocol. If any node participating in a RMW parity update protocol (that is, the primary data node, the first parity node or the second parity node) fails during the preparation phase, the lowest survivor node in the forward sequence initiates an abort sequence with the survivor nodes. If a node fails during the commit phase, the lowest survivor node in the forward sequence restarts the commit sequence with the survivor nodes. If two nodes fail during each phase, the lone survivor node either aborts or commits by itself. An abort sequence is a forwarding message chain, similar to the commit/lock message chain that causes each surviving node to roll back its state to that before the start of the parity update protocol. In particular, locks are removed and no new parity is committed and no new data is marked as parity integrated.

If the fast write operation of system 10 replicates copies of new data to the primary data node and to all of the associated parity nodes, then in an alternative embodiment the primary data node may send the old copy of the data to the first parity node which is forwarded to subsequent parity nodes instead of the delta. Each parity node may compute its new parity from its old parity, the just received old data and the new data received during the fast write operation. In other embodiments the payloads of messages and the computation of new parities may differ. Each of these alternatives is within the spirit of this invention.

In case of a node failure, a surviving node closest to (and including if it survives) the primary data node in the forwarding messaging order, assumes the role of the recovery driver and completes or fails the protocol with the remaining survivor nodes.

The specific forward message ordering of the parity nodes for each primary data node and the locking/unlocking steps are arranged so that if the protocol is initiated concurrently by two or more primary data nodes that share one or more parity nodes, the protocol is deadlock and starvation free. When a parity node, which has its parity locked during a RMW parity update protocol from one primary data node, receives a first parity update protocol message from another primary data node, the parity node can either reject the second parity update request (by an "abort/try again later" response) or may hold the second message until the completion of its unlock step for the first parity update protocol, at which point it may proceed with the second parity update protocol.

The invention provides a data driven protocol as well as locking/forwarding/recovery. The explicit payloads and computation properties are not essential to the invention. There are many alternatives that anyone skilled in the art will appreciate.

As noted, each primary data node is capable of maintaining (either in memory or on disk, or both) at least two versions of the data for a strip. The first copy is the fast write copy comprising new data that was written into the storage system by a host or client but has not yet been integrated into the parity strips. The second copy is the parity-integrated copy/version that has been incorporated into the mathematical relationships defining the parity values. Fast write versions transition to the parity integrated version at completion of the parity update protocol at all relevant parity nodes (the prior parity-integrated version can be discarded as well).

Similarly, each parity node maintains a version of its parity strip value that contains (per the mathematical relationship defining that parity value) the current parity-integrated value for each of the data strips computed into that parity strip. Each parity node also manages a working copy that is computed as an intermediate value during the parity update protocol. At the end of the parity update protocol (as viewed by each parity node), the parity node transitions the working copy to the parity-integrated value and discards a previous parity-integrated value.

For each primary data node, there must be a defined ordered relationship of its parity nodes in sequence. For example, if a primary data node has two parity nodes P0 and P1, then the ordered relationship may be P0<P1, or P1<P0. As such, each primary data node has a first parity node and a second parity node. The defined ordered relationship may be the same for each, or some, of the primary data nodes (e.g., if the primary data nodes share the same parity nodes). The ordered relationship may be different for each primary data node (e.g., if each primary data node has a different pair of parity nodes compared to another primary data node). This set of ordered relationships (one for each primary data node) is specified for the entire stripe so as to avoid a deadlock or starvation condition among concurrently initiated parity update protocols. The ordering is dependent on the specific erasure code used.

As noted, the parity update protocol involves a preparation/lock phase and a commit phase. The preparation phase proceeds as follows. First, the primary data node locks its fast write data from further update. Then, in a "read-modify" step, it computes a delta value, the exclusive OR (XOR) of its fast write copy and its parity integrated copy (which may need to be read from disk). The primary data node then sends a "Prepare&Lock" message to the first parity node, wherein the payload of the message contains the computed delta value.

The first parity node takes three actions. First, it locks its parity-integrated value from update by a different primary data node (only one such protocol can run concurrently). Second, the first parity node forwards the "Prepare&Lock" message (with delta value payload) to the second parity node. Third, the first parity node computes a working parity value as the mathematical combination of the delta value and its parity-integrated value (without destroying the parity-integrated value). The combination is determined by a mathematical formula (e.g., Reed-Solomon encoding) by which the parity value is computed. These last two actions may be taken in parallel or in series.

Upon receipt of the message from the first parity node, the second parity node locks its parity-integrated value from further update by a different primary data node and also computes its new working parity value by the appropriate mathematical combination of its parity-integrated value and the delta value. When complete, the second parity node sends a "ready" ACK reply to the first parity node. When the first parity node has completed its tasks and received the "ready" ACK reply, the first parity node forwards the "ready" ACK reply back to the primary data node. Receipt of the "ready" ACK reply at the primary data node completes the lock/preparation phase.

In a commit phase, the primary data node sends a "Commit" request message to the first parity node, which in turn forwards the request to the second parity node. Upon receipt of the request, the second parity node transitions its working parity value to its parity-integrated value and responds to the first parity node with a "done" ACK reply. The second parity node also unlocks its parity-integrated value from update. The first parity node, on receipt of "done" ACK reply, transitions its working parity value to the parity-integrated value and also unlocks it. It then sends a final reply of "done" ACK reply to the primary data node. The primary data node transitions its fast write version of the data to its parity-integrated version and unlocks it (allowing it to accept new fast write data). This completes the lock phase and the parity update protocol.

If a node participating in the parity update protocol either fails completely or fails because it can no longer perform the function of primary data node or first or second parity node (failure of other nodes has no effect on the parity update protocol) during the parity update protocol, a successor driver node handles the recovery with the survivor nodes. During the preparation/lock phase, a node failure causes a roll back to the initial state, wherein the successor driver nodes initiates a forwarded abort sequence with the survivor nodes. For example, if the first parity node fails, then the primary data node is the successor driver node and sends an abort to the second parity node. If the second parity node fails, then the primary data node is again the successor driver node and sends an abort to the first parity node. If the primary data node fails, then the first parity node is the successor driver node and initiates an abort sequence with the second parity node. The successor driver node is the survivor closest to (and possibly including) the primary data node in the forwarding order. Similarly, during the commit phase, a node failure causes a roll forward of the protocol. The successor driver node (as defined above) restarts the commit sequence. If only one node survives, then it autonomously performs recovery (abort in the preparation/lock phase) or commit (in the commit phase). Those skilled in the art recognize that generalization to higher fault tolerance is within the scope of the invention.

After a node failure, it is possible that a surviving node (specially a down-stream node) will have not received the initial message starting the protocol. Hence it may have no context for the abort message it receives. This is acceptable as it indicates that the node is in the intended state. Similarly, if a node failure occurs during the lock phase, a second commit message may arrive at a down-stream node. This again is acceptable since the node will have already completed the commit during the lock phase and is in the desired state.

In terms of interaction between instances of parity update protocols, at the primary data node during the parity update protocol, no new fast write data can be integrated into the fast write version used to compute the delta value. There are alternative embodiments. First, additional buffer space can be utilized to hold other fast write data for the strip, in effect having a third buffer space for fast write data not involved in parity update protocol. Second, the lock on the fast write version need only be set at the start of the lock phase. To accommodate this, if new fast write data arrives at the primary data node during the prepare/lock phase, and then instead of completing the protocol with the commit phase, the primary data node can abort the protocol with an explicit abort phase. This is similar to the commit phase in message ordering and replies, but the abort instruction informs the parity nodes to discard their working parity value and to not transition them to the parity-integrated value (the protocol rolls back to the initial state).

If a parity node (first or second) receives a parity update request (Prepare&Lock) from a second primary data node during the processing of a parity update protocol from a first primary data node, the parity node can either delay responding to the new request until the first parity update protocol is complete, or reject the second request indicating that a parity update protocol is in progress. The second primary data node can retry the protocol at a later time. The specific ordering of the parity nodes for each primary data node prevents starvation in the delay case and deadlock in the reject case. In either case, the first parity update protocol will be able to reach completion.

The parity update protocol may be extended to higher fault tolerance. If a data strip is encoded into three or more parity values on three or more parity nodes, then the parity update protocol again orders each of the parity nodes in a specific way. The protocol is then forwarded in each of the preparation/lock phase and the commit phases from the primary data node to each of the parity nodes according to the specific order for that primary data node. If one or more nodes fail during the protocols, the successor survivor node (defined by the node closest to, and possibly including, the primary data node) drives the completion of the protocol (i.e., abort during the preparation/lock phase and commit during the commit phase).

Two example implementations of read-modify-write for maintaining parity coherency are described below.

RAID6

Figure 4:
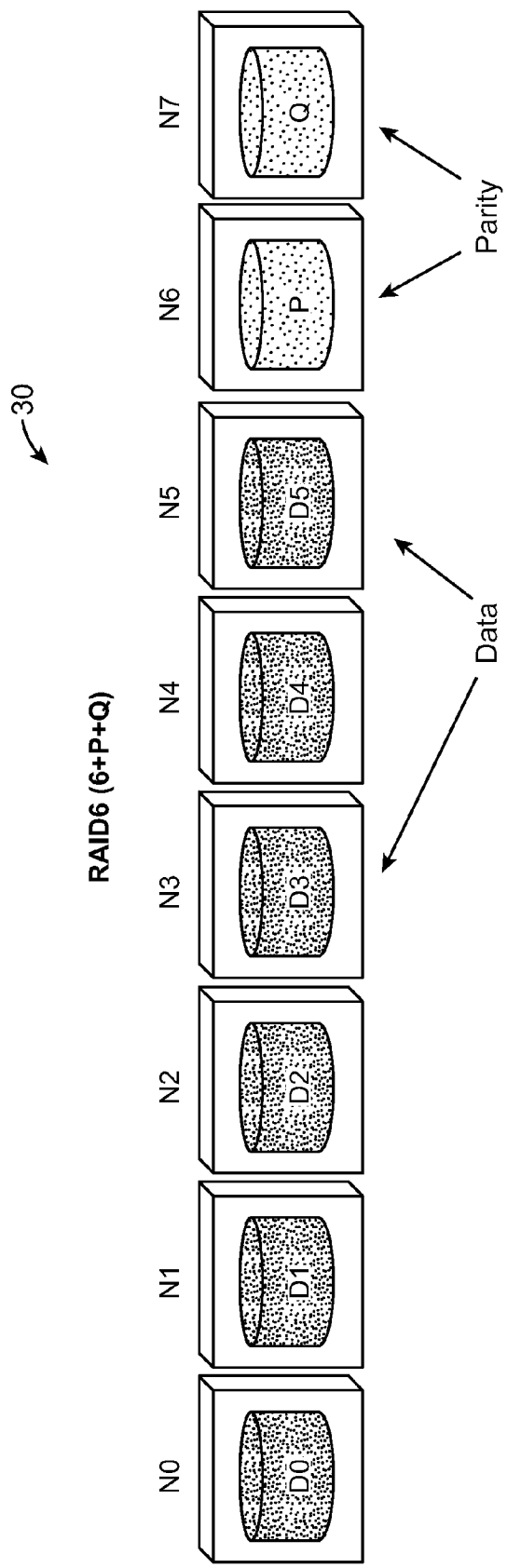
FIG. 4 shows an example embodiment of data parity layout for a distributed data storage system implementing a RAID6 erasure code to which the RMW protocol is applicable.

FIG. 4 shows an example distributed redundancy data storage system 30, illustrating data and parity relations for the RAID6 erasure code on six data nodes (N0 through N5) and two parity nodes N6, N7, with fault tolerance two. RAID6 provides a storage system with a striped set and dual distributed parity with fault tolerance from two disk drive failures (the storage system can continue operation when one or two disk drives fail).

FIG. 4 shows 6 data strips D0 through D5. According to the invention, a P parity is computed with a mathematical formula (e.g., exclusive OR) of the six data strips D0 through D5. Further, a Q parity is computed by a different mathematical formula (e.g., Reed-Solomon encoding). Other mathematical formulas may also be used. In this erasure code there are six primary data nodes and two parity nodes. The forwarding order for each primary data node is the same: P<Q, meaning P comes before Q in the forwarding order (the alternate order of Q<P is also possible). There may be variations where the order is P<Q for some primary data nodes and Q<P for others. A common order (e.g., P<Q) is sufficient to prevent deadlock or starvation.

Figure 5:
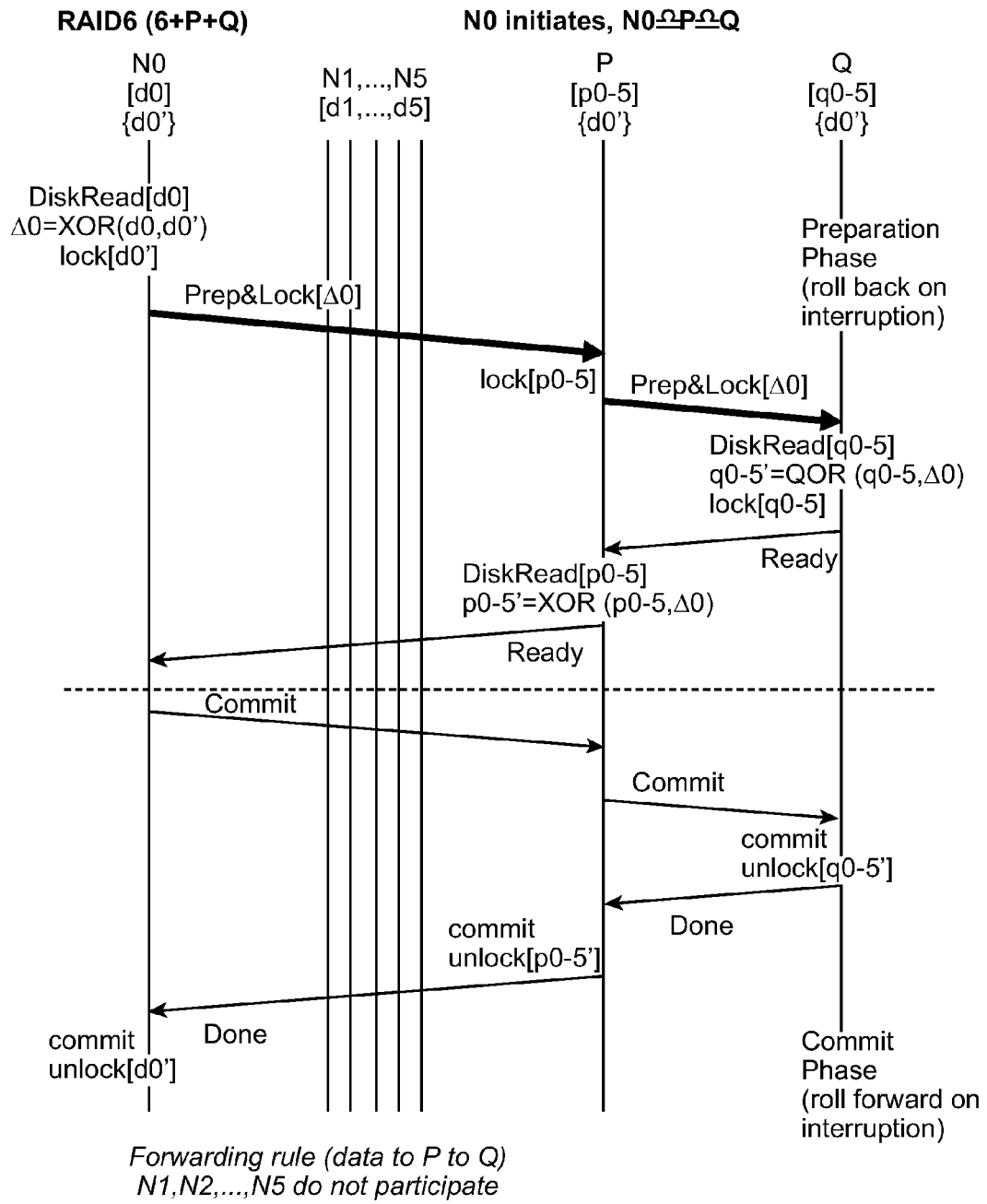
FIG. 5 shows an example event sequence in a RMW protocol process for maintaining parity coherency in a write-back distributed storage system implementing a RAID6 erasure code.

FIG. 5 shows an event sequence 40 (top to bottom) for the parity update protocol implemented by system 30 in FIG. 4 according to an embodiment of the invention, wherein node N0 initiates the parity update protocol. The expression {d0'} indicates fast write data. In this example, the fast write data is mirrored on three different nodes. The expression QOR represents a mathematical formula used to compute or update the Q-parity value.

Specifically, FIG. 5 illustrates a sequence diagram wherein each vertical line represents a node in the storage system that holds, and is responsible for, data in a RAID6 stripe with 6 data strips and parities P and Q (so RAID6(6+P+Q)). Other nodes in the storage system not related to this stripe are not represented. The vertical bars labeled N0,N1, . . . , N5 represent nodes that each hold one of the six data strips in the stripe. The vertical bars labeled P and Q, respectively, represent nodes that hold the P parity value and Q parity value for the stripe, respectively. Below the labels are one or two symbol expressions. The expression [d0] represents the parity integrated version of the data for strip 0 stored on node N0. Similarly, the symbols [d1, . . . , d5], [p0-5], and [q0-5] represent the parity integrated versions of the data strips d1 through d5 inclusive, and the P parity strip p0-5 (computed from the parity integrated data d0,d1, . . . , d5), and the Q parity stripe q0-5 (also computed from the parity integrated data d0,d1, . . . , d5), respectively. The expression {d0'} under N0, P and Q represents new fast write data for strip 0 that has been replicated on the three nodes N0, P and Q and not yet integrated into the parity values.

In the diagram, arrows represent communication messages sent from the node at the tail of the arrow to the node at the head of the arrow. Thick arrows represent messages that contain data (more generally, bulk payloads), and thin arrows represent control messages or responses that have no bulk payloads. The dashed line across the middle represents a transition between the two phases of the protocol. In the first phase ("Preparation Phase"), an interruption in the protocol is handled by a roll back of the protocol. In the second phase ("Commit Phase"), an interruption is handled by a roll forward of the protocol. The annotation at the bottom indicates the "forwarding rule" of the invention for the RAID6 version of the protocol, as does the header "N0 initiates, N0→P→Q" (i.e., a data node initiates the protocol by the first message to P, which forwards to Q (responses follow the reverse path)).

Time is represented downward in the diagram. The relative size of the time gaps does not necessarily represent time to scale (only representing relative ordering in time).

The protocol is initiated by the node N0 and proceeds as follows. In the first phase (Preparation Phase), in the "DiskRead[d0]" step, N0 reads the parity integrated version of the data [d0] (this is most likely stored on disk). Next, in the "$\Delta 0$=XOR(d0,d0')" step, N0 computes the delta between the parity integrated version and the new version of the data. The process now proceeds to "lock[d0']" from further update (e.g., by a new host write). This is to guarantee that no change is made to the value d0' until the protocol completes the integration of the current d0' into the parity (a variant of the protocol can relax this requirement and may mark {d0'} as "in preparation for parity integration"); if a new write arrives during the preparation phase, then the protocol may be safely aborted (rolled back)). The absolute locking of {d0'} is only required during the Commit Phase. Once the lock[d0'] is in place, N0 sends a message to the P parity node. The message indicates: (a) start a Preparation for parity integration of {d0'}; (b) lock parity [p0-5] such that no other node can proceed with the same protocol simultaneously; and (c) provides as payload the data delta value $\Delta 0$. Node P then takes two actions: it locks [p0-5] as instructed and forwards the message (complete with bulk $\Delta 0$) to the node Q. Node Q takes the following actions. It reads ("DiskRead[q0-5]") the old integrated copy of the Q-parity value (most likely from disk). Node Q computes ("q0-5'=QOR(q0-5, $\Delta 0$)") the new value of the Q-parity q0-5' from the old value and the Δ0 forwarded in the message from P and finally it locks [q0-5] from update. This is not essential when the forwarding rule of the protocol sends the first message always through P since the lock at P will preclude any conflicting messages from arriving at Q (in FIG. 7 this is not the case, however). When completed with these steps, Node Q sends the "Ready" response (control message) back to P indicating that Q has completed its part in the Preparation Phase of the protocol. Node Q, either after forwarding the first message to Q or after (as indicated in FIG. 5) it receives the response from Q, performs the analogous action as Q with respect to computing its updated p0-5' value from the old value (which is reads from disk ("DiskRead[p0-5]")) and the data delta Δ0. Once P has both computed its new value and received the "Ready" response from Q, then P has completed all of its part in the Preparation Phase (and is aware that Q has completed its part), then P sends a "Ready" response back to N0 (this indicates to N0 that both P and Q have completed the Preparation Phase). On receipt of this "Ready" response from P, N0 completes its part in the Preparation Phase and the Preparation Phase is complete.

The Commit Phase again begins with a message "Commit" from N0 to P who forwards it to Q. On arrival at Q, Q commits (transitions) the computed copy q0-5' as the "integrated" copy, unlocks its parity value (enabling other updates to occur) and sends "Done" response message back to P. Q has now completed its role in the protocol. P, on receipt of the "Done" response from Q, performs the analogous actions: commits (transitions) the computed copy p0-5' as the "integrated" copy, unlocks its parity value (enabling other parity update protocols from other nodes) and responds to N0 with "Done" message. Finally, N0, on receipt of this "Done" response from P, commits its d0' copy as the "integrated copy" and unlocks d0', allowing new updates to be written to the same address location. This completes the Commit Phase (it also concludes the protocol).

The expressions [d0] and [d1, . . . , d5] represent data versions that are integrated into the parity represented by [p0-5] and [q0-5]. The expressions p0-5' represent the working copy of the new parity maintained on parity node P. Similarly, the expression q0-5' represents the working copy of the new parity maintained on parity node Q. DiskRead[d0], DiskRead[p0-5] and DiskRead[q0-5] each represent the operation of reading from disk the respective data or parity strip. The expression Prep&Lock[Δ0] indicates a message between two nodes that requests a lock on the related data or parity strip and a payload of [Δ0], the computed delta between [d0] and {d0'}. The expressions lock[d0'], lock[p0-5], lock [q0-5], unlock[d0'] unlock[p0-5'] and unlock[q0-5'] represent the actions of locking and unlocking respectively, the indicated data or parity strip. The expressions p0-5'=XOR(p0-5, Δ0) and q0-5'=QOR(q0-5, Δ0) represent the mathematical relationship whereby p0-5' is computed from p0-5 and Δ0 and q0-5' is computed from q0-5 and Δ0, respectively. The expression Ready indicates a (good) ACK to the Prep&Lock request; the expression Done indicates a (good) ACK to the Commit request message.

Weaver

Figure 6:
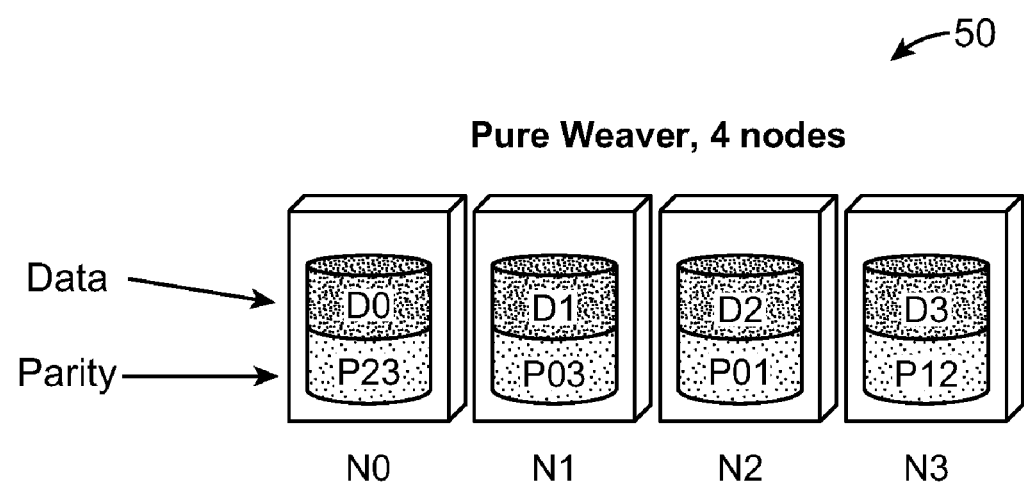
FIG. 6 shows an embodiment of the data parity layout for a distributed data storage system implementing the Weaver erasure code to which the RMW protocol is applicable.

FIG. 6 shows an example distributed redundancy data storage system 50, illustrating data stripes D0 through D3 and parity (P23, P03, P01, P12) for the Weaver code on 4 nodes (N0 through N3), with fault tolerance two. The design features of Weaver codes include: (a) placement of data and parity blocks on the same strip, (b) constrained parity in-degree, and (c) balance and symmetry. These codes are in general not maximum distance separable (MDS) but have optimal storage efficiency among all codes with constrained parity in-degree. Weaver codes are described in James Lee Hafner, "WEAVER Codes: Highly Fault Tolerant Erasure Codes for Storage Systems," published at http://www.usenix.org/events/fast05/tech/full_papers/hafner_weaver/hather_weaver.pdf, December 2005.

In FIG. 6, each node performs three roles in this erasure code. Each node is a primary data node and each node is also a parity node for two other primary data nodes. In this erasure code, each data node has two parity nodes that it needs to coordinate with. The two parity nodes are different for each primary data node. The ordering of first and second parity node for each primary data node is performed lexicographically with respect to the parity held by the nodes. Accordingly, N2<N1<N3<N0 since N0 holds the parity P01, N1 holds P03, N3 holds P12 and N0 holds P23. Each data node sends its first parity update protocol message to the lowest parity node in this order that has parity for that data node, and the lowest parity node forwards the protocol message to the next lowest parity node that has parity for that data. Specifically, the following message traffic ensues:

N0 sends message to N2 which forwards to N1,
N1 sends message to N2 which forwards to N3,
N2 sends message to N3 which forwards to N0,
N3 sends message to N1 which forwards to N0.

Figure 7:
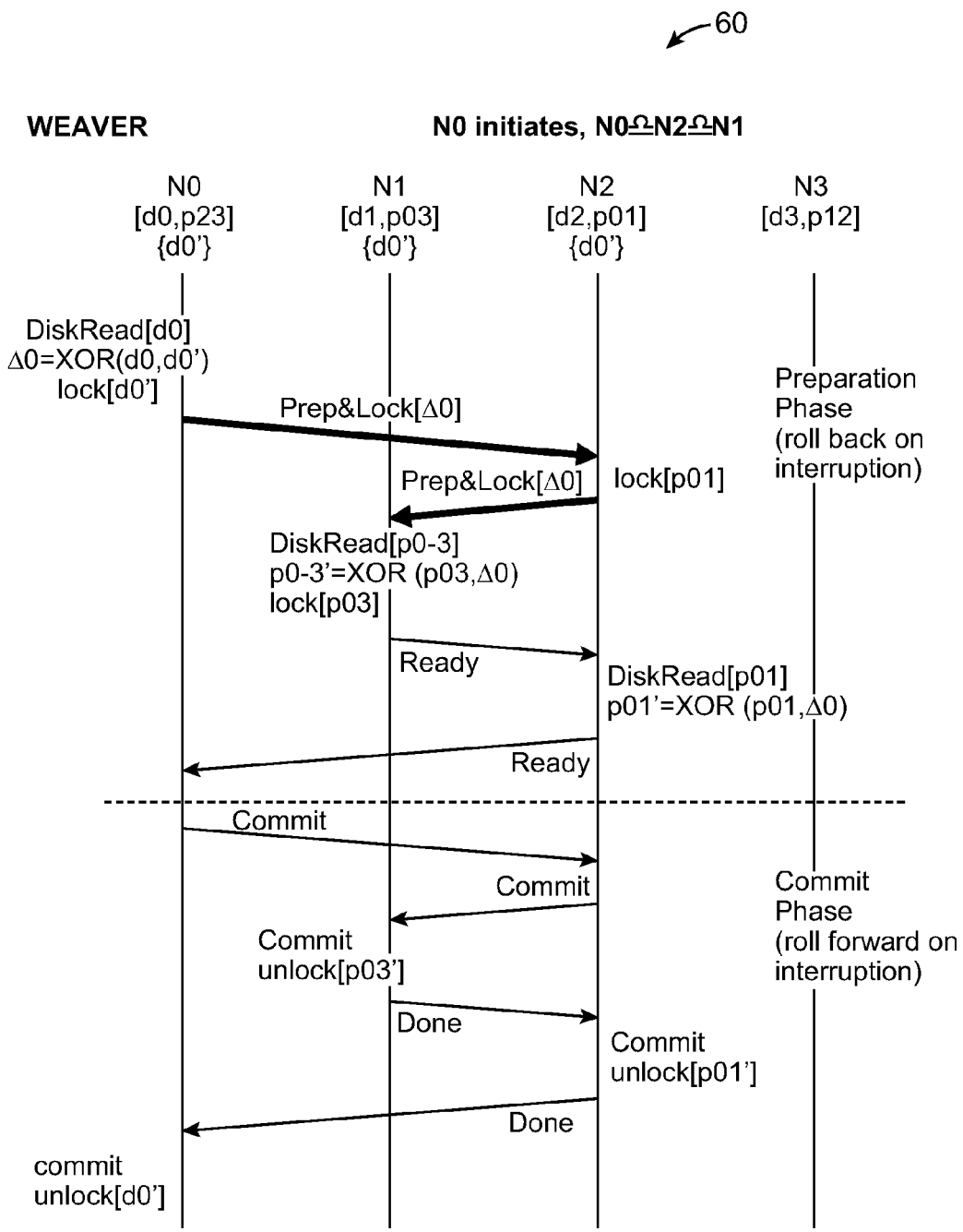
FIG. 7 shows an example event sequence in a RMW protocol process for maintaining parity coherency in a write-back distributed storage system implementing the Weaver erasure code.
Figure 7:
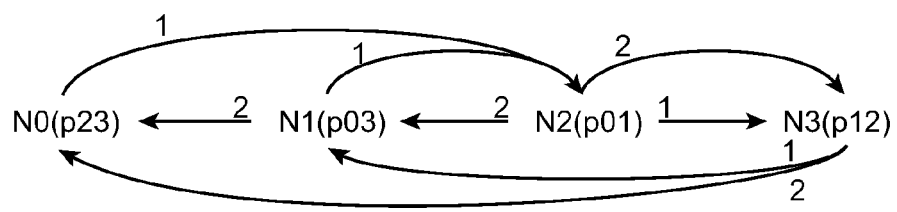

FIG. 7 shows an event sequence 60 (top to bottom) for the parity update protocol implemented by system 50 of FIG. 6, according to an embodiment of the invention, wherein node N0 initiates the protocol. The expression {d0'} indicates fast write data. In this example, the fast write data is mirrored on three different nodes.

Specifically, FIG. 7 represents an embodiment of the invention for the WEAVER code (two fault tolerant on 4 nodes). The structure of FIG. 7 is similar to that of FIG. 5. The vertical bars represent nodes in the system, however, in this case there are only 4 nodes, labeled N0, N1, N2 and N3. Time ordering is represented top-down, arrows indicate messages, with thick arrows indicating bulk messages (with payload) and thin arrows indicating control messages (without bulk payload). For this erasure code, each node has a responsibility for both a data node function and a parity node function. In analogy with FIG. 5, N2 plays the role of P and N2 plays the role of Q for the data node N0. N2 and N1 hold parity values (p01 and p03, respectively) into which the data d0 is computed. The forwarding rule for N0 is N0->N2->N1. As indicated at the bottom of FIG. 7, the forwarding rule is different for each data node (this is in contrast to FIG. 5 where in RAID6 the order is always the same for each data node). For example, Node N1 sends its parity update protocol messages first to N2 and then to N3. One embodiment of the rule is defined by a lexicographic ordering of the nodes by the parity labels (other embodiments are possible so long as there are no cycles).

Below the node labels are symbols that represent parity integrated versions of data and parity. For example, on node N0, [d0,p23] indicates that N0 is responsible as the primary owner for data on strip0 and also the parity owner for the parity p23=XOR(d2,d3). The [ ] brackets indicate that these two values are the parity integrated values. Similarly, the expressions [d1,p03] for N1, [d2,p01] for N2 and [d3,p12] for N3 represent the parity integrated values of d1,d2 and d3 and the parity values p03=XOR(d0,d3), p01=XOR(d0,d1) and p12=XOR(d1,d2). The expressions {d0'} below the labels for N0, N1 and N2 indicate that each of these nodes is holding a new version of data for strip 0 (d0') that is not yet parity integrated.

In this RAID configuration, it is essential that the second parity node in the forwarding order (N1 in the FIG. 7) locks its parity from update (this is in contrast to FIG. 5). In this case, because the forwarding order is different for each data node, a lock at N2 is not sufficient to prevent parity update protocols from reaching N1 (e.g., N3 starts its parity update protocol by sending its first message to N1 (holder of p03)). That is, some nodes are both first in the forward ordering for some data nodes and second for other data nodes. For this reason, the lock operation must be performed by each node on request, before it sends a "Ready" response. The remainder of the description of the sequence diagram in FIG. 7 is identical to that of FIG. 5, on replacing P by N2 and Q by N1, replacing p0-5 with p01 and q0-5 with p03, and replacing QOR with a simple XOR (and therefore not repeated here again).

The non-cyclic ordering in FIG. 7 meets the conditions to prevent deadlock or starvation (enabling at least one of two concurrent parity update protocols to proceed, whether or not the other is rejected or paused).

The [d0,p23], [d1,p03], [d2,p01], [d3,p12], and the subexpressions d0, d1, d2 and d3, represent data versions integrated into their respective parity versions. The subexpressions p23, p03, p01, and p12 are the integrated parity for the data with the indicated number label (as such, p01 is the integrated parity for d0 and d1). The expressions p03' represents the working copy of the new parity maintained on node N1 which is the primary data node for d1 and the second parity node for d0 and the first parity node for d3. Similarly, the expression p01' represents the working copy of the new parity maintained on node N2 (the primary data node for d2 and the first parity node for both d0 and for d1). DiskRead[d0], DiskRead[p03] and DiskRead[p01] each represent the operation of reading from disk the respective parity integrated data or parity strip. The expression Prep&Lock[Δ0] indicates a message between two nodes that requests a lock on the related data or parity strip and a payload of [Δ0], the computed delta between [d0] and {d0'}. The expressions lock[d0'], lock[p03], lock[p01], unlock[d0'], unlock[p03'] and unlock[p01'] represent the actions of locking and unlocking respectively, the indicated data or parity strip. The expressions p03'=XOR(p03, Δ0) and p01'=XOR(p01, Δ0) represent the mathematical relationship whereby p03' is computed from p03 and Δ0 and p01' is computed from p01 and Δ0, respectively. The expression Ready indicates a (good) ACK to the Prep&Lock request; the expression Done indicates a (good) ACK to the Commit request message. The arrow diagram at the bottom of FIG. 7 indicates the forwarding order for each primary data node to its first and second parity node.

As such, a data-driven RMW protocol for parity update on a distributed redundancy storage system with fast write provides the following features. The parity ordering for each primary data node prevents two RMW protocols that overlap at a parity node from running concurrently while allowing for forward progress to at least one of the parity protocols. In one example, an initiating primary data node initially locks out parity update protocols for three nodes (itself, and two others). A first message from the initiating node is directed to a node in the protocol chain of the remaining nodes. The first set of messages (i.e., the first set of forwarding messages of the prepare and lock phase (not the ACK replies)) to reach an intersecting node dominate, while the other messages are delayed or rejected in the first phase. Two RMW protocols that do not overlap at either parity node may run simultaneously (concurrently). In the presence of a failure during a RMW protocol, in the preparation phase, the protocol rolls back, wherein the successor node in the forward order expressly aborts the protocol during this phase (all work is discarded and retried when all the nodes are stabilized). Further, in the commit phase, the protocol will generally roll forward wherein the successor node in the forward order re-drives the commit protocol to ensure consistency among the survivor nodes.

The RMW protocol is applicable to any two or more fault tolerant erasure codes, provided the parity ordering for each primary data node is defined appropriately. The RMW protocol does not require interaction or knowledge or recovery of state to any node that failed and was replaced during the protocol. The survivor nodes of the original protocol are the only nodes in the completion (either roll back or roll forward) of the protocol.

The number of fast write copies of new data maintained in the system and where they are maintained, is an example feature of the RMW parity update protocol described herein. There are many alternative embodiments. If one or more fast write copies are held within one or more of the parity nodes for that data, these copies can be discarded once the parity update protocol is complete at a parity node. If one or more fast write copies are held elsewhere in the storage system, then an explicit "discardable" message from the primary data node to the fast write holder enables release of the resources used for those copies.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to a processor for execution. Such a medium may take many forms, including but not limited to, non-volatile media, volatile media and transmission media. Non-volatile media includes, for example, optical or magnetic disks. Volatile media includes dynamic memory. Transmission media includes coaxial cables, copper wire and fiber optics, including the wires that comprise a bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of maintaining data storage reliability in a write-back distributed data storage system including multiple nodes, each node comprising an array of failure independent data storage devices, the method comprising:
   storing information as a set of stripes, each stripe including a collection of multiple data strips and associated parity strips, the stripes distributed across multiple corresponding primary data nodes and multiple corresponding parity nodes;
   a primary data node maintaining the data strip holding a first copy of data, and each parity node maintaining a parity strip holding a parity for the multiple data strips;
   performing a read-modify-write parity update protocol for maintaining parity coherency, a primary data node driving parity coherency with its corresponding parity nodes, independently of other data nodes, in order to keep its relevant parity strips coherent;
   during a preparation phase, upon a node failure, a lowest survivor node in a forward sequence driving an abort sequence for the read-modify-write parity update protocol; and
   during a commit phase, upon a node failure, the lowest survivor node in the forward sequence driving a restart of the commit phase for the read-modify-write parity update protocol.

2. The method of claim 1, wherein:
each parity is calculated based on a different parity calculation formula; and
performing a read-modify-write parity update protocol further comprises:
the primary data node computing a difference between existing data and new data;
in a preparation phase:
the primary data node sending the difference to a first parity node, each parity node forwarding the difference to a next parity node in a predefined sequence;
each parity node reading the existing parity for the data, and computing a new parity from the difference;
starting from the last parity node in the sequence, each parity node sending an acknowledgement message to an immediately prior parity node in the sequence; and
the first parity node sending an acknowledgement message to the primary data node, indicating completion of the preparation phase.

3. The method of claim 2, wherein performing a read-modify-write parity update protocol further comprises:
in a commit phase:
the primary data node sending a commit message to the first parity node, each parity node forwarding the commit message to a next parity node in a predefined sequence;
each parity node committing its newly computed parity value;
starting from the last parity node in the sequence, each parity node sending an acknowledgement message to an immediately prior parity node in the sequence; and
the first parity node sending an acknowledgement message to the primary data node, indicating completion of the commit phase.

4. The method of claim 3 further comprising:
the primary data node maintaining at least two versions of the data for a strip, a fast write version and a parity-integrated version, wherein the fast write copy has been written into a storage system by a host or client and not integrated into a parity strip, and wherein the parity-integrated version has been incorporated into a process for defining a parity value; and
transitioning the fast write version to the parity-integrated version at completion of a parity update protocol at all relevant parity nodes, whereby the prior parity-integrated version may be discarded.

5. The method of claim 4 further comprising, in each parity node:
maintaining a working version of its parity strip value containing a current parity-integrated value for each of the data strips computed into that parity strip; and
at the end of the parity update as viewed by each parity node, the parity node transitioning the working version to the parity-integrated value and discarding a previous parity-integrated value.

6. A write-back distributed data storage system for maintaining data storage reliability, comprising:
multiple nodes, each node comprising an array of failure independent data storage devices;
the nodes configured for storing information as a set of stripes, each stripe including a collection of multiple data strips and associated parity strips, the stripes distributed across multiple corresponding primary data nodes and multiple corresponding parity nodes, a primary data node configured for maintaining the data strip holding a first copy of data, and each parity node maintaining a parity strip holding a parity for the multiple data strips;
the primary data node further configured for performing a read-modify-write parity update protocol for maintaining parity coherency, the primary data node driving parity coherency with its corresponding parity nodes, independently of other data nodes, in order to keep its relevant parity strips coherent;
during a preparation phase, upon a node failure, a lowest survivor node in a forward sequence drives an abort sequence for the read-modify-write parity update protocol; and
during a commit phase, upon a node failure, the lowest survivor node in the forward sequence drives a restart of the commit phase for the read-modify-write parity update protocol.

7. The system of claim 6, wherein:
each parity is calculated based on a different parity calculation formula; and
the primary data node is further configured for computing a difference between existing data and new data;
in a preparation phase:
the primary data node sends the difference to a first parity node, each parity node forwards the difference to a next parity node in a predefined sequence;
each parity node reads the existing parity for the data, and computes a new parity from the difference;
starting from the last parity node in the sequence, each parity node sends an acknowledgement message to an immediately prior parity node in the sequence; and
the first parity node sends an acknowledgement message to the primary data node, indicating completion of the preparation phase.

8. The system of claim 7, wherein:
in a commit phase:
the primary data node sends a commit message to the first parity node, each parity node forwards the commit message to a next parity node in a predefined sequence;
each parity node commits its newly computed parity value;
starting from the last parity node in the sequence, each parity node sends an acknowledgement message to an immediately prior parity node in the sequence; and
the first parity node sends an acknowledgement message to the primary data node, indicating completion of the commit phase.

9. The system of claim 8, wherein:
the primary data node maintains at least two versions of the data for a strip, a fast write version and a parity-integrated version, wherein the fast write copy has been written into a storage system by a host or client and not integrated into a parity strip, and wherein the parity-integrated version has been incorporated into a process for defining a parity value.

10. The system of claim 9, wherein each parity node is further configured for:
maintaining a working version of its parity strip value containing a current parity-integrated value for each of the data strips computed into that parity strip; and
at the end of the parity update as viewed by each parity node, the parity node transitioning the working version to the parity-integrated value and discarding a previous parity-integrated value.

11. The system of claim 6, wherein:
the nodes are configured for storing information as plural stripes, each stripe including a collection of a data strip and associated parity strips, the stripes distributed across a primary data node and multiple corresponding parity nodes;
a specified parity node message forwarding order is maintained for each primary data node and corresponding parity nodes; and
each primary data node is configured for driving parity coherency with its corresponding parity nodes, independently of other data nodes, in keeping its relevant parity strips coherent.

12. A computer program product for maintaining data storage reliability in a write-back distributed data storage system including multiple nodes, each node comprising an array of failure independent data storage devices, the computer program product comprising:
a non-transitory computer readable medium having a computer usable program code embodied therewith, the computer usable program code comprising:
computer usable program code configured to store information as a set of stripes, each stripe including a collection of multiple data strips and associated parity strips, the stripes distributed across multiple corresponding primary data nodes and multiple corresponding parity nodes;
computer usable program code configured for the primary data node to maintain the data strip holding a first copy of data, and each parity node to maintain a parity strip holding a parity for the multiple data strips and perform a read-modify-write parity update protocol for maintaining parity coherency, and the primary data node to drive parity coherency with its corresponding parity nodes, independently of other data nodes, in order to keep its relevant parity strips coherent; and
computer usable program code configured for, during a preparation phase, upon a node failure, a lowest survivor node in a forward sequence driving an abort sequence for the read-modify-write parity update protocol.

13. The computer program product of claim 12 further comprising:
computer usable program code configured for calculating each parity based on a different parity calculation formula, and for the primary data node to compute a difference between existing data and new data;
computer usable program code configured for, in a preparation phase:
the primary data node to send the difference to a first parity node, each parity node forwarding the difference to a next parity node in a predefined sequence;
each parity node to read the existing parity for the data, and computing a new parity from the difference;
starting from the last parity node in the sequence, each parity node to send an acknowledgement message to an immediately prior parity node in the sequence; and
the first parity node to send an acknowledgement message to the primary data node, indicating completion of the preparation phase.

14. The computer program product of claim 13 further comprising:
computer usable program code for, in a commit phase:
the primary data node sending a commit message to the first parity node, each parity node forwarding the commit message to a next parity node in a predefined sequence;
each parity node committing its newly computed parity value;
starting from the last parity node in the sequence, each parity node sending an acknowledgement message to an immediately prior parity node in the sequence; and
the first parity node sending an acknowledgement message to the primary data node, indicating completion of the commit phase.

15. The computer program product of claim 14 further comprising:
computer usable program code configured for the primary data node maintaining at least two versions of the data for a strip, a fast write version and a parity-integrated version, wherein the fast write copy has been written into a storage system by a host or client and not integrated into a parity strip, and wherein the parity-integrated version has been incorporated into a process for defining a parity value;
computer usable program code configured for transitioning the fast write version to the parity-integrated version at completion of a parity update protocol at all relevant parity nodes, whereby the prior parity-integrated version may be discarded;
computer usable program code configured for each parity node performing:
maintaining a working version of its parity strip value containing a current parity-integrated value for each of the data strips computed into that parity strip; and
at the end of the parity update as viewed by each parity node, the parity node transitioning the working version to the parity-integrated value and discarding a previous parity-integrated value.

16. The computer program product of claim 12 further comprising:
computer usable program code configured for, during a commit phase, upon a node failure, the lowest survivor node in the forward sequence driving a restart of the commit phase for the read-modify-write parity update protocol.

17. The computer program product of claim 12 further comprising:
computer usable program code configured for storing information as plural stripes, each stripe including a collection of a data strip and associated parity strips, the stripes distributed across a primary data node and multiple corresponding parity nodes;
computer usable program code configured for providing a specified parity node message forwarding order for each primary data node and corresponding parity nodes; and
computer usable program code configured for each primary data node driving parity coherency with its corresponding parity nodes, independently of other data nodes, in keeping its relevant parity strips coherent.

* * * * *